(No Model.)

J. R. HARE.
REFRIGERATOR BASKET.

No. 537,683. Patented Apr. 16, 1895.

WITNESSES
Dan'l Fisher
George Hemsley

INVENTOR
John R. Hare,
by Geo. W. T. Arnand,
atty.

THE NORRIS PETERS CO., PHOTO-LITHO., WASHINGTON, D. C.

UNITED STATES PATENT OFFICE.

JOHN R. HARE, OF BALTIMORE, MARYLAND.

REFRIGERATOR-BASKET.

SPECIFICATION forming part of Letters Patent No. 537,683, dated April 16, 1895.

Application filed November 1, 1894. Serial No. 527,610. (No model.)

*To all whom it may concern:*

Be it known that I, JOHN R. HARE, of the city of Baltimore and State of Maryland, have invented certain Improvements in Refrigerator-Baskets, of which the following is a specification.

This invention relates to certain improvements in that class of baskets which are especially designed for the transportation of fish and various other uncooked and cooked edible articles, together with ice for their preservation.

The object of the present invention is to construct a basket for the purpose described which will be light in weight, easy and cheap to make, and a poor conductor of heat so that the contained ice will not be wasted.

In the further description of the said invention which follows, reference is made to the accompanying drawings, forming a part hereof, and in which—

Figure 1:
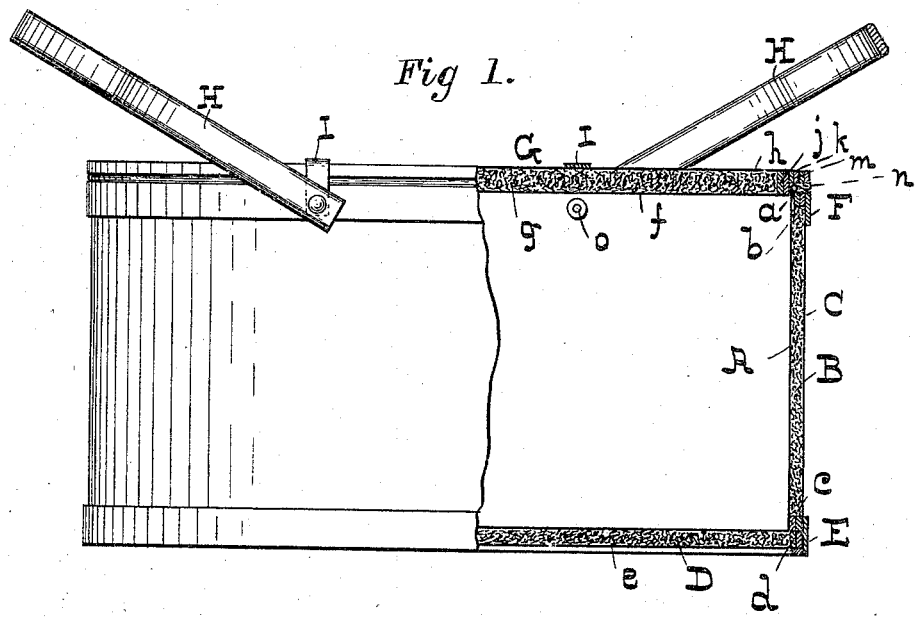
Figure 2:
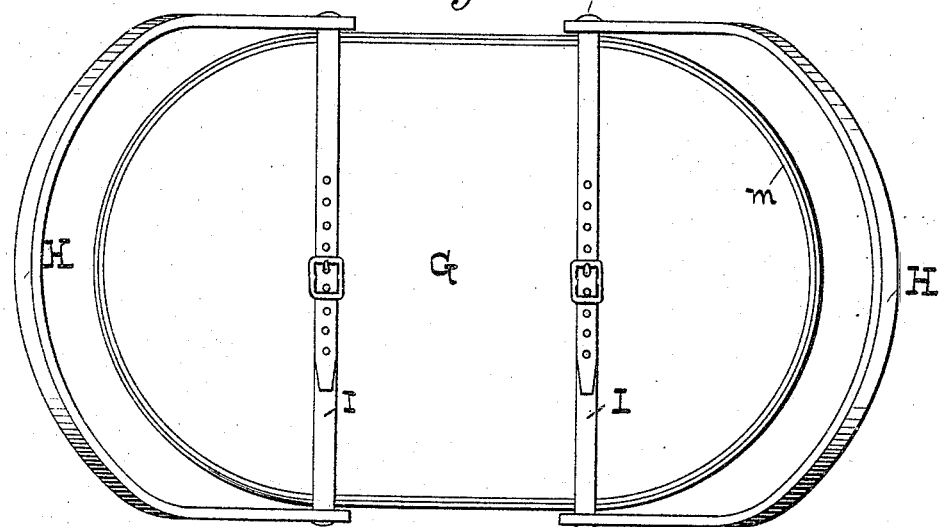
Figures 3, 4:
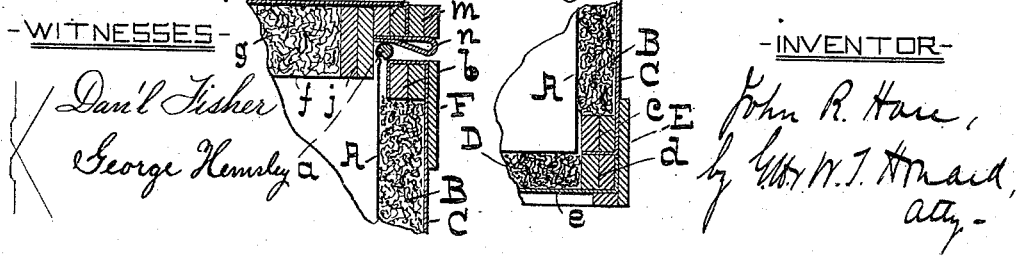

Figure 1 is a side view of the improved basket with a portion of the same broken away to show the construction of its wall, bottom and lid. Fig. 2 is a top view of the basket. Fig. 3 is an enlarged view of the top edge of the wall, and the edge of the lid. Fig. 4 is an enlarged section of the lower end of the wall and a part of the bottom.

Referring now to the drawings, A is an inner sheet metal pan shown as having parallel sides and rounded ends. The top of the pan A has an exterior bead $a$ which may be wired or not as desired.

Around the pan A, and directly under the bead $a$, is a frame formed of two strips $b$ of wood, which are bent one over the other to form a shape corresponding with the pan A but somewhat larger. Around the bottom of the pan A are two bent strips of wood $c$ corresponding in size and shape with the ones $b$. Between the strips $b$ and $c$ and extending entirely around the pan A, is a body of felt B which corresponds in thickness with the strips $b$ and $c$.

C is a sheet of canvas or duck preferably made waterproof by coating it with some suitable varnish, stretched around the felt covering, and with its ends sewed together. The top and bottom edges of this canvas or duck casing are turned in, respectively over the strips $b$ and $c$ and secured thereto.

D is a sheet of felt placed on the outside of the pan bottom, and $d\ d$ are strips similar to the ones $b$ and $c$ which confine the edge of the felt. Over the felt D is stretched a sheet $e$ of canvas or duck with its edges turned over the strips $d$.

E is a hoop whereby the lower sheet of felt D, is secured to the felt covering B, and F a similar hoop for the top edge of the basket.

The lid G consists of a plate of sheet metal $f$ covered by a layer of felt $g$ and an outer casing $h$ of canvas or duck. The sheet metal plate $f$ is nailed to a wood frame $j$, and the whole is hooped, the hoops $k$ and $m$ holding between them the edge of the canvas $h$. The portion of the lid under the hoops $k$ and $m$ is provided with a folding soft gasket $n$ to make the connection between the lid and basket practically air tight.

H H are bails pivoted to the sheet metal can A, and the hoop F which surrounds it. The rivets $o$ which form the pivots for the bails H also serve to hold to the basket, straps I the ends of which are buckled together and over the top of the lid to keep it in place.

The canvas casing made waterproof, is found to be the best material for the outside of the basket, as it is cheaper and lighter than wood, wicker or interlaced chip work, and is stronger than veneer and a better non-conductor of heat.

I claim as my invention—

In a refrigerator basket, the combination of a sheet metal pan having a beaded upper edge, a frame formed of wood strips secured around the pan directly under the bead, a second wood frame corresponding in all essential particulars with the first, fastened around the lower edge of the pan and projecting below the bottom, a body of felt confined around the pan between the two frames, a second body of felt placed over the bottom of the pan and confined at its edges by the projecting portion of the lower frame, a sheet of canvas or duck stretched around the wood frames and another over the lower body of felt, and hoops to hold the two sheets of canvas to the frames, substantially as specified.

JOHN R. HARE.

Witnesses:
WM. T. HOWARD,
DANL. FISHER.